(12) United States Patent
Twyford

(10) Patent No.: US 6,386,413 B1
(45) Date of Patent: May 14, 2002

(54) APPARATUS AND METHOD FOR MOUNTING A COMPUTER SYSTEM IN A VEHICLE

(75) Inventor: Robert H. Twyford, Great Falls, VA (US)

(73) Assignee: Datalux Corporation, Winchester, VA (US)

(*) Notice: Subject to any disclaimer, the term of this patent is extended or adjusted under 35 U.S.C. 154(b) by 0 days.

(21) Appl. No.: 09/537,460

(22) Filed: Mar. 27, 2000

(51) Int. Cl.⁷ .................................................. B60R 7/00
(52) U.S. Cl. .................... 224/553; 224/282; 224/42.38; 224/548; 224/557; 224/929; 108/44; 108/50.01; 108/138; 108/145; 248/124.1; 248/918; 248/923; 361/683; 361/686
(58) Field of Search .................... 224/483, 282, 224/42.38, 42.4, 548, 549, 553, 557, 929; 361/683, 686; 248/122.1, 124.1, 917, 918, 923; 108/42, 44, 48, 50.01, 138, 145

(56) References Cited

U.S. PATENT DOCUMENTS

| 4,946,120 A |   | 8/1990  | Hatcher |         |
|-------------|---|---------|---------|---------|
| 5,632,462 A | * | 5/1997  | Kallas  | 248/286.1 |
| 5,638,579 A |   | 6/1997  | Tenney  |         |
| 5,673,628 A |   | 10/1997 | Boos    |         |
| 5,751,548 A | * | 5/1998  | Hall et al. | 361/686 |
| 5,859,762 A | * | 1/1999  | Clark et al. | 361/686 |
| 6,113,047 A | * | 9/2000  | Wung et al. | 248/284.1 |
| 6,179,263 B1 | * | 1/2001 | Rosen et al. | 248/278.1 |
| 6,260,486 B1 |   | 7/2001 | Boos et al. | |
| 6,213,438 B1 |   | 10/2001 | Ostby et al. | |

FOREIGN PATENT DOCUMENTS

| CH | 686823 A5 | * | 7/1996 |
| EP | 0183288 A2 | * | 6/1986 |

* cited by examiner

Primary Examiner—Stephen K. Cronin
(74) Attorney, Agent, or Firm—Joseph G. Seeber

(57) ABSTRACT

An apparatus and a method for mounting a computer system in a vehicle provides for rigid mounting of a computer/display unit in the vehicle so as to reduce or eliminate the adverse effects of vibration caused by operation of the vehicle. The latter advantage is achieved by provision of a gas spring and crank arm arrangement connected to an L-bar, the latter being mounted via its lower, horizontal member to a base plate of the vehicle. The apparatus and method also provide superior flexibility in orientation of the keyboard for use by any occupant of the front of the vehicle. The latter advantage is achieved by mounting the keyboard to the L-bar via a rigid arm having two points of rotation, one point of rotation at its point of connection to the L-bar, and another point of rotation at its point of connection to the keyboard.

17 Claims, 3 Drawing Sheets

APPARATUS AND METHOD FOR MOUNTING A COMPUTER SYSTEM IN A VEHICLE

TECHNICAL FIELD

The present invention generally relates to an apparatus and method for mounting a computer system in a vehicle, and more particularly to an apparatus and method which firmly presses a computer/display unit of the computer system against the dashboard of the vehicle, while providing the occupants of the vehicle with the capability of flexibly adjusting the orientation of the keyboard associated with the computer system.

BACKGROUND ART

The use of a computer system, including a keyboard and a computer/display unit, in a vehicle is becoming more prevalent. For example, such computer systems are employed in police vehicles or emergency vehicles.

In order to provide the best screen visibility to a vehicle operator, the computer/display unit (typically, a flat display panel) must be located high enough relative to the dashboard of the vehicle so as to be at or near the eye level of the driver without obstructing the view through the windshield. Such a computer/display unit can be mounted on the floor of the vehicle and elevated to the eye level of the driver. However, the mechanism used to elevate the computer/display unit substantially above the level of the floor of the vehicle can result in a high degree of vibration, especially during operation of the vehicle. Such vibration makes it difficult for the driver to focus on the screen data. In addition, such vibration could conceivably result in damage to the computer/display unit.

A further drawback with present day systems resides in the fact that a keyboard, associated with the computer system, is typically mounted to the same mechanism or frame which is used to elevate the display to the eye level of the driver. Such present day mechanisms are burdened by the disadvantage that they do not provide flexibility in the orientation of the keyboard. As a result, a keyboard is typically oriented to face the driver, or to face the passenger, but it cannot be moved from one position to another.

Thus, there has been a need for the development of an apparatus and method for mounting a computer system in a vehicle, the apparatus and method providing a firm mounting of the computer/display unit in the vehicle so as to reduce or eliminate the adverse effects of vibration on the computer/display unit. There has also been a need for the development of an apparatus and method for mounting a computer system in a vehicle wherein the keyboard may be flexibly moved between or through various positions so as to be convenient to whichever occupant of the vehicle is to operate the computer system.

DISCLOSURE OF INVENTION

The present invention generally relates to an apparatus and method for mounting a computer system in a vehicle, and more particularly to an apparatus and method wherein a computer/display unit of the computer system is firmly mounted within the vehicle so as to reduce or eliminate the adverse effects of vibration, and wherein the keyboard of the computer system is flexibly mounted so as to be movable so as to be oriented to face more than one occupant of the vehicle.

In accordance with the invention, firm mounting of the computer/display unit in the vehicle is achieved by employment of a biasing mechanism which causes the computer/display unit to bear firmly against the dashboard of the vehicle at the location where the computer screen is mounted in the vehicle. In accordance with a further feature of the invention, the keyboard is mounted on a rigid arm which is hinged at both ends thereof, so that the rigid arm rotates about a first hinge point, while the keyboard rotates relative to the rigid arm about a second hinge point. In this manner, the keyboard can be positioned at an infinite number of orientations relative to the occupants of the vehicle.

Therefore, it is an object of the present invention to provide an apparatus and method for mounting a computer system in a vehicle.

It is an additional object of the present invention to provide an apparatus for mounting a computer system in a vehicle, wherein the computer/display unit of the computer system is firmly positioned against the dashboard of the vehicle to as to reduce or eliminate the adverse effects of vibration.

It is an additional object of the present invention to provide an apparatus and method for mounting a computer system in a vehicle wherein the keyboard may be positioned at an infinite number of orientations so as to face any of the occupants seated near the keyboard in the vehicle.

The above and other objects, and the nature of the invention, will be more clearly understood by reference to the following detailed description, the drawings and the appended claims.

BEST MODE FOR CARRYING OUT THE INVENTION

The invention will now be described in more detail with reference to the various figures of the drawings.

Figure 1:
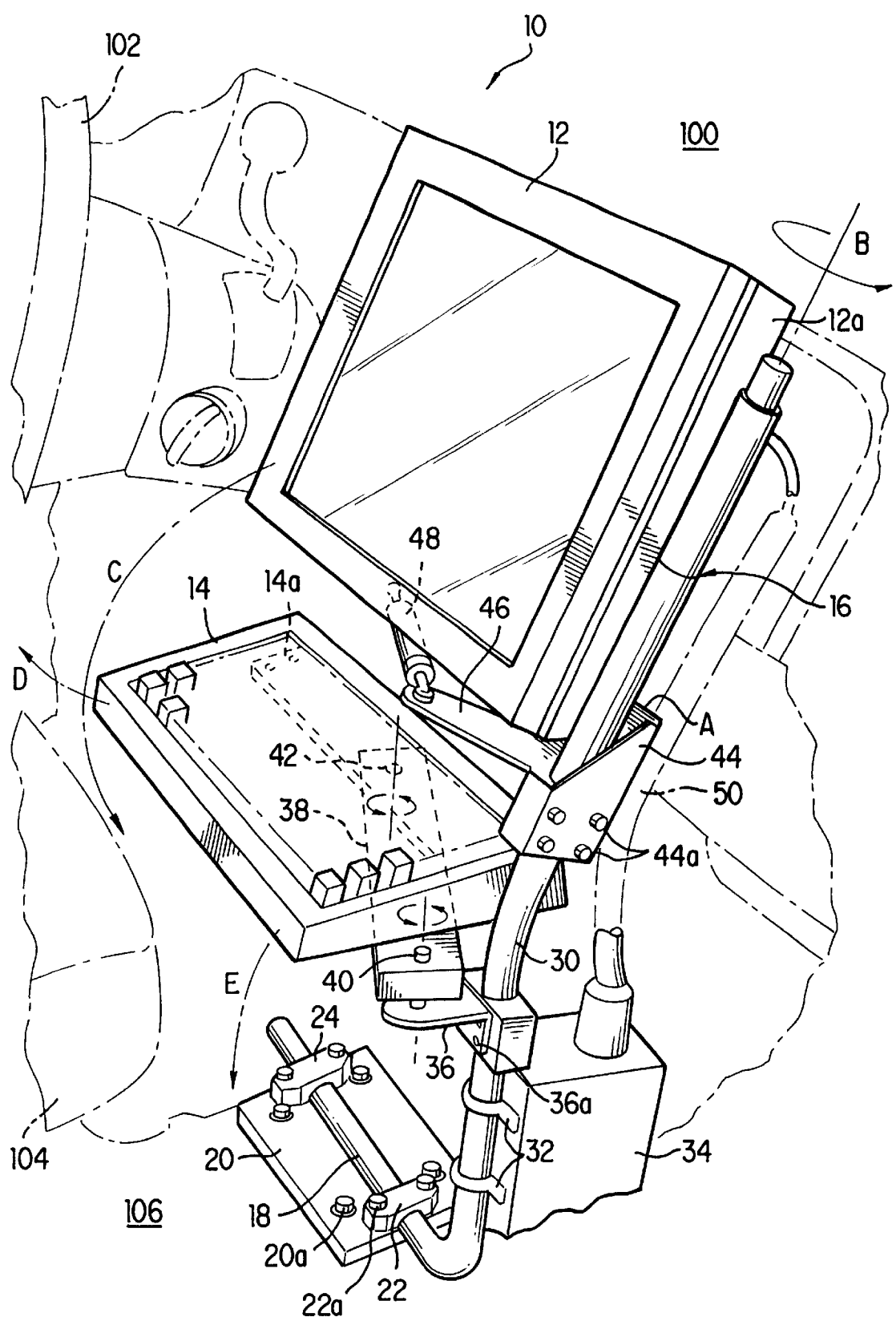
FIG. 1 is perspective view of the apparatus for mounting a computer system in a vehicle in accordance with the invention.
Figure 2:
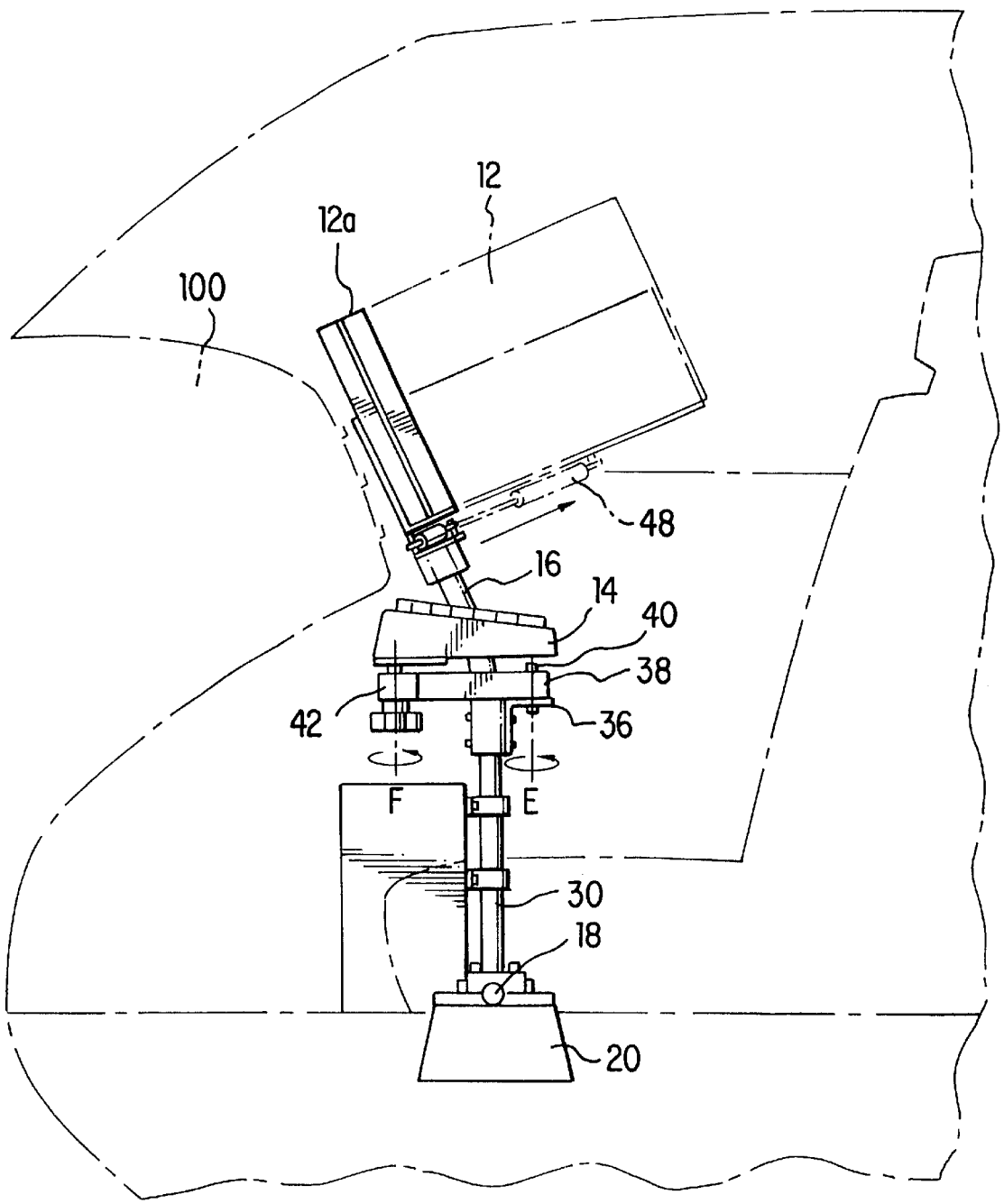
FIG. 2 is a side view of the apparatus of FIG. 1.
Figure 3:
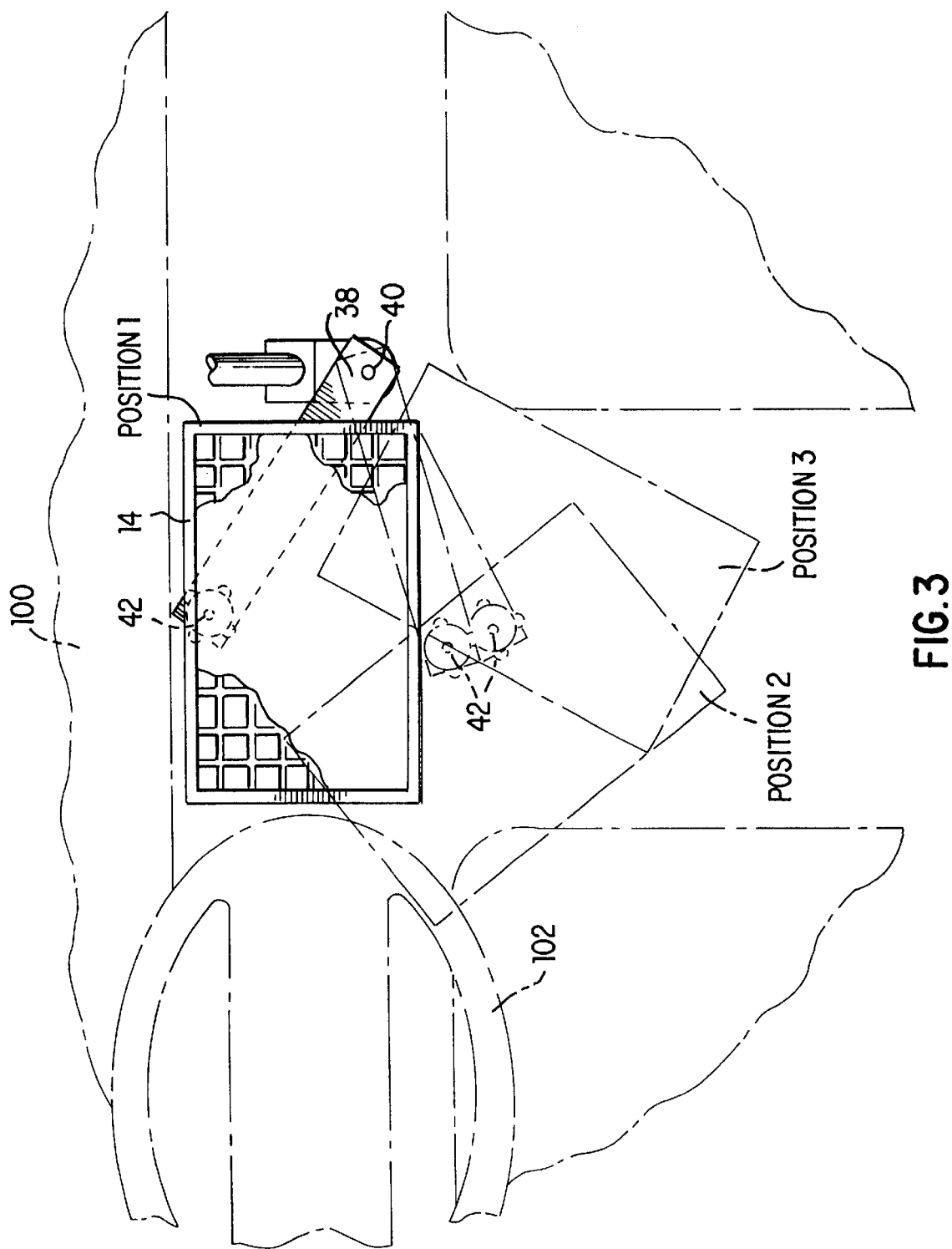
FIG. 3 is a top view of the apparatus of FIG. 1.

FIG. 1 is perspective view of the apparatus for mounting a computer system in a vehicle in accordance with the invention; FIG. 2 is a side view of the apparatus of FIG. 1; and FIG. 3 is a top view of the apparatus of FIG. 1.

Referring to the various figures of the drawings, the apparatus 10 of the present invention is used to mount a computer system in a vehicle, the vehicle typically including a dashboard 100, a steering wheel 102, a seat 104, and a floor 106. The computer system which is mounted in the vehicle using the apparatus 10 typically includes a computer/display unit 12 and a keyboard 14 associated therewith, as well as other components (not shown). Typically, the computer/display unit 12 is a flat display panel recently developed in order to conserve space.

In accordance with the invention, the computer/display unit 12 is mounted on a hinged plate 12a, the plate 12a being hingedly mounted on an L-bar 16. The L-bar 16 includes an L-bar vertical member 30 and an L-bar horizontal member 18.

The L-bar horizontal member 18 is connected, via first and second connectors 22 and 24, respectively, to a base plate 20 mounted on the floor 106 of the vehicle. Preferably, a lowermost portion of the L-bar vertical member 30 is fixed, via mounting brackets 32, to a hub box 34, which serves as a central hub to receive the various data cables of the system (for example, from the keyboard, the computer/display unit, a modem, etc.). A data cable (preferably, a USB connector) 50 extends between the hub 34 and the computer/display unit 12, while another data cable (not shown) extends between the hub 34 and the keyboard 14. As indicated above, other data cables connected to other components of the computer system are connected to the hub 34.

As best seen in FIG. 1, a crank arm 46 extends horizontally from a bracket 44 which is adjustably mounted at a mid point of the L-bar 16 so that arm 46 lies under a lower edge of the computer/display unit 12. A gas spring 48 has one end connected to a distal end of the arm 46, while the other end of the gas spring 48 is connected to a point on the computer/display unit 12 (preferably, a bottom edge portion thereof).

Thus, in accordance with the invention, L-bar horizontal member 18 is rigidly attached to the base plate 20 of the vehicle, and is pre-adjusted to provide the computer/display unit 12 with a bias against the dashboard 100, with resultant pressure being absorbed at point A (see FIG. 1). The computer/display unit 12 is held onto a hinged plate 12a which may be rotated in the direction of arrow B (FIG. 1) about the longitudinal or vertical axis of L-bar vertical member 30, allowing the computer/display unit 12 to be rotated in the direction of arrow C (FIG. 1) away from the dashboard 100, thereby providing access to any controls located on the dashboard 100. The gas spring 48 on crank arm 46 allows hinge movement, and also provides pressure on hinge plate 12a so that the hinge plate 12a experiences a constant pressure against the dashboard 100 when in the normal position.

A keyboard mounting bracket 36 is mounted on a lower portion of L-bar vertical member 30, and is connected via a first hinge 40 to a rigid arm 38. The rigid arm 38 is connected, via a second hinge 42, to a keyboard mounting plate 14a fixed to the bottom surface of the keyboard 14. Accordingly, arm 38 is rotatable about hinge 40 connected to bracket 36, while the keyboard 14 is rotatable about hinge 42 connected to a distal end of the arm 38.

Thus, in accordance with the invention, the keyboard 14 is double-hinged to move in a horizontal plane so that it can assume at least three orientations: a first orientation in which it is stored against the dashboard 100; a second orientation in which it is positioned to face the driver seated behind the steering wheel 102 (see arrow D in FIG. 1); or a third orientation in which it is positioned to face the passenger seated to the right of the driver in the vehicle (see arrow E in FIG. 1). The hinges 40 and 42 are, preferably, friction hinges as disclosed in U.S. Pat. No. 5,638,579. The first hinge 40 is located between the bracket 36 attached to L-bar 16 and the rigid arm 38 leading to the second hinge 42 located at a distal end of the arm 38. The second hinge 42 is positioned between the arm 38 and a point on keyboard mounting plate 14a, the latter being fixed to, and preferably located near the center of gravity of, the keyboard 14. The preset hinge friction provided by this arrangement retains the keyboard 14 stably in its desired position.

The following is a description of the procedure by which the apparatus 10 for mounting a computer system in a vehicle is installed. Base plate 20, with the L-bar horizontal member 18 connected thereto via connectors 22 and 24, is mounted on the floor 106 of the vehicle using screws (such as screw 20a) of suitable length. The screws 20a are hand-tightened initially, and the upper portion of the apparatus 10 is leaned against the dashboard 100, and a computer bracket (not shown) located at the center of the hinged plate 12a is centered relative to the air conditioning vents in the vehicle (also not shown). The forward edge of the base plate 20 is elevated using a shim (a commonly used tool known to those of skill in the art), and the screws 20a are again hand-tightened.

The vertical position of the gas spring 48 can be adjusted by sliding bracket 44 along L-bar 16 to an appropriate vertical position and then tightening screws 44a so as to fix bracket 44 in place. With the apparatus 10 leaning against the dashboard 100, the screws (such as screw 22a) holding the connectors 22 and 24 to the base plate 20 are adjusted.

The shim, which was previously used to elevate the forward edge of base plate 20, is removed, and the screws 20a holding the base plate 20 to the floor of the vehicle are tightened. This forces the apparatus 10 against the dashboard 100, and the apparatus 10 is now rigidly in place. The computer bracket (not shown) located on hinged plate 12a is swung out from the dashboard 100 and the computer/display unit 12 is mounted thereon using a plastic latch (not shown) located on the back of the computer/display unit 12. The computer/display unit 12 is then swung back to the dashboard 100 and is seated against the dashboard 100 with its top edge, preferably, brushing against the underside of the glare shield of the vehicle.

The keyboard 14 is now mounted in place on a keyboard mounting plate 14a, the plate 14a being fixed to a bottom surface of the keyboard 14. Mounting plate 14a is connected via hinge 42 to a distal end of arm 38, as previously mentioned. The keyboard 14 is, preferably, positioned at a desired height and with correct horizontal placement, at which point the mounting bracket 36 is securely tightened to L-bar 16 by tightening screws, such as screw 36a.

Hub 34 is then positioned against L-bar vertical member 30 as shown in FIG. 1, and is clamped thereto by brackets or clamps 32. A power connector (not shown) connected to the battery of the vehicle is then plugged into the hub 34, and USB connector 50 from computer/display unit 12 is also plugged into hub 34. If desired, a USB/serial converter cable can be used to connected an external radio frequency, (RF) modem.

At this point, the apparatus 10 has been fully installed, and is ready for operation. As so installed, the computer/display unit 12 is rigidly and firmly mounted in the vehicle so as to reduce or eliminate vibration due to operation of the vehicle. The firm mounting is primarily accomplished as a result of the fact that the horizontal member 18 is rigidly attached to the base plate 20 and is preadjusted to provide a bias against the dashboard 100, with resultant pressure being absorbed at point A (see FIG. 1). Moreover, the computer/computer/display unit 12 is held firmly onto hinged plate 12a, and the gas spring 48 on crank arm 46 not only allows hinged movement of the computer/computer/display unit 12, but also provides the hinged plate 12a with a constant pressure against the dashboard 100 when in the normal operating position.

In accordance with a further feature of the invention, the keyboard 14 is uniquely mounted so as to provide complete flexibility in orienting the keyboard for use by any occupant in the front of the vehicle. Specifically, the keyboard 14 is, as previously described, double hinged via hinges 40 and 42 mounted on opposite ends of the rigid arm 38 so that the keyboard 14 can be stored against the dashboard 100, positioned to face the driver of the vehicle, or positioned to face a passenger sitting next to the driver of the vehicle. Finally, the preset hinge friction of hinges 40 and 42 retains the keyboard 14 stably in its desired position.

While preferred forms and arrangements have been shown in illustrating the invention, it is to be understood that various changes and modifications may be made without departing from the spirit and scope of this disclosure.

What is claimed is:

1. An apparatus for mounting a computer system in a vehicle, comprising:

a frame;

mounting means for mounting said frame to the vehicle;

display holding means connected to said frame for holding a display unit of the computer system; and biasing means connected to said display holding means for biasing said display holding means so as to press said display holding means and said display unit held thereby firmly against a dashboard of the vehicle;

wherein said display holding means comprises a crank arm connected to said frame, and said biasing means comprises a gas spring connected between said crank arm and said display unit.

2. The apparatus of claim 1, further comprising keyboard holding means connected to said frame for holding a keyboard.

3. The apparatus of claim 1, wherein said frame comprises a vertical member to which said display holding means is connected.

4. The apparatus of claim 3, wherein said display holding means further comprises a hinged plate for holding said display unit.

5. The apparatus of claim 4, wherein said hinged plate is connected to said vertical member in a hinge-like manner so that said display unit and said hinged plate are rotatable about said vertical member.

6. An apparatus for mounting a computer system in a vehicle, comprising:

a frame;

mounting means for mounting the frame to said vehicle;

display holding means connected to said frame for holding a display unit of the computer system; and biasing means connected to said display holding means for biasing said display holding means so as to press said display holding means and said display unit held thereby firmly against a dashboard of the vehicle;

said apparatus further comprising keyboard holding means connected to said frame for holding a keyboard;

wherein said keyboard holding means comprises a bracket connected to said frame, and a rigid arm connected to said bracket by a first hinge and connected to said keyboard by a second hinge.

7. An apparatus for mounting a computer system in a vehicle, comprising:

a frame;

mounting means for mounting said frame to the vehicle; and keyboard holding means connected to said frame for holding a keyboard;

wherein said frame extends vertically toward said keyboard, and said keyboard holding means comprises a bracket having a straight portion connected to and extending horizontally from said frame, a rigid arm, a first hinge for connecting said rigid arm to said straight portion of said bracket, and a second hinge for connecting said rigid arm to said keyboard.

8. The apparatus of claim 7, further comprising display holding means connected to said frame for holding a display unit.

9. The apparatus of claim 7, wherein said bracket comprises an L-shaped element having a vertical portion.

10. The apparatus of claim 9, wherein said vertical portion is fixed directly to said frame, and said straight portion is connected to said vertical portion and extends horizontally therefrom to said first hinge.

11. The apparatus of claim 7, wherein said frame comprises an L-bar including interconnected horizontal and vertical members.

12. The apparatus of claim 11, wherein said bracket is connected to said vertical member of said L-bar.

13. The apparatus of claim 11, wherein said horizontal member is connected to the vehicle by said mounting means, and said vertical member is connected to said bracket.

14. An apparatus for mounting a computer system in a vehicle, comprising:

a frame;

mounting means for mounting said frame to the vehicle; and keyboard holding means connected to said frame for holding a keyboard;

wherein said keyboard holding means comprises a rigid arm, a first hinge for connecting said rigid arm to said frame, and a second hinge for connecting said rigid arm to said-keyboard;

said apparatus further comprising display holding means connected to said frame for holding a display unit;

wherein said display holding means comprises a crank arm connected to said frame, and a biasing device connected between said crank arm and said display unit.

15. The apparatus of claim 14, wherein said biasing device comprises a gas spring.

16. A method for mounting a computer system in a vehicle, comprising the steps of:

providing a frame;

mounting said frame to said vehicle;

mounting a keyboard holding mechanism horizontally to said frame;

mounting a keyboard on said keyboard holding mechanism;

providing said keyboard holding mechanism with two hinged points of rotation for rotatable orientation of said keyboard;

mounting a display unit holding mechanism horizontally to said frame;

mounting a display unit of said computer system on said display unit holding mechanism;

providing said display unit holding mechanism with a gas spring interconnecting said display unit and said frame; and utilizing said gas spring to bias said display unit and said frame against a dashboard of the vehicle.

17. The method of claim 16, wherein said keyboard holding mechanism is connected to said frame at a first one of said hinged points of rotation so that said keyboard holding mechanism is rotatable about said frame, and wherein said keyboard holding mechanism is mounted to said keyboard at a second one of said hinged points of rotation so that said keyboard is rotatable about said keyboard holding mechanism.

* * * * *